United States Patent [19]

Fisher et al.

[11] Patent Number: 5,222,518
[45] Date of Patent: Jun. 29, 1993

[54] AIR FLOW CONTROL VALVE

[75] Inventors: Joel T. Fisher, South St. Paul; Richard D. Lewis, Bloomington; Charles Rescorla, Plymouth, all of Minn.

[73] Assignee: Graco Inc., Golden Valley, Minn.

[21] Appl. No.: 934,419

[22] Filed: Aug. 24, 1992

[51] Int. Cl.⁵ ............................................. F16K 17/22
[52] U.S. Cl. ..................... 137/460; 137/495; 251/29
[58] Field of Search ................ 137/460, 495; 251/29

[56] References Cited
U.S. PATENT DOCUMENTS

| | | |
|---|---|---|
| 2,497,549 | 2/1950 | Heller . |
| 3,400,734 | 9/1968 | Rosenberg ........................ 137/460 X |
| 3,434,493 | 3/1969 | Owens . |
| 3,965,927 | 6/1976 | Siczek . |
| 4,188,971 | 2/1980 | Otteson . |
| 4,311,296 | 1/1982 | Scheffel ............................... 251/29 |
| 4,373,548 | 2/1983 | Chou . |
| 4,605,039 | 8/1986 | Johnson et al. . |
| 4,809,740 | 3/1989 | Nevlud . |
| 4,924,905 | 5/1990 | Mastromatteo . |

Primary Examiner—Robert G. Nilson
Attorney, Agent, or Firm—Palmatier, Sjoquist & Helget

[57] ABSTRACT

An air valve having a runaway control feature, including a movable piston which is insertable into air blocking position in a valve passage, a diaphragm separating two chambers, one chamber being coupled to the air passage upstream of the movable piston and the other chamber coupled to the air passage downstream of the movable piston, a rod movable by the diaphragm to activate a second air valve, the second air valve controlling the flow of air from the air passage upstream of the piston valve to the piston valve itself, thereby forcing the piston valve to move into air closure position in the passageway when the pressure drop upstream and downstream of the piston valve exceed predetermined limits. The invention includes a test feature which includes a third valve for manually unbalancing the air pressure across the diaphragm chambers to simulate the runaway air flow condition and thereby actuate the piston valve closure.

9 Claims, 2 Drawing Sheets

AIR FLOW CONTROL VALVE

BACKGROUND OF THE INVENTION

The present invention relates to safety valves for controlling excessive flow rates through a delivery system; the invention particularly relates to an air valve for controlling the volumetric flow rate of air through pressurized lines, wherein a feature is provided for testing the operation of the valve under normal flow conditions.

Runaway control valves are known in the art, where they are typically used to shut down a pressurized air line whenever flow rate exceeds predetermined values. Such valves typically utilize a pressure-sensitive valve member which monitors pressure drop across a portion of the pressure line, and when the pressure drop exceeds a predetermined amount the movable valve member closes off the line. Once the pressure line has been closed in this manner, most prior art valves require that the valve be manually reset in order to reopen the line for pressurized gas flow.

One example of an application for a runaway control valve is in an air-operated motor and pumping system, particularly of the type where the pressurized air supply is used to energize a reciprocable air motor, and the air motor is mechanically linked to a liquid pump. In this type of system, the reciprocation rate of the air motor is a function of the air pressure applied to its input as balanced against the liquid pressure forces of the pumped output. If the pump liquid is caused to flow freely, as by opening some sort of liquid delivery valve, the loading of the air motor decreases and the air supply into the air motor causes it to reciprocate at a faster rate; this causes the pump to reciprocate at a faster rate and increases the volume of liquid delivered through the line. At some point a balance is reached whereby the liquid delivered by the pump is equal to the liquid drained from the system and the pressure is equalized. At this point the air motor reciprocates at a regular rate, sufficient to continue the flow of liquid. If, for example, the liquid delivery line ruptures and causes an uncontrolled drain of liquid, the air motor will reciprocate at an ever increasing rate to attempt to equalize the delivery flow rates, which may become impossible because of the nature of the rupture. In such situations, a runaway flow control valve inserted into the pressurized air line which drives the air motor is essential, for the runaway valve detects the excessively high flow rates of air delivered to the motor and automatically shuts off the air source to the air motor. Without a runaway flow control valve in such a system, the air motor could reciprocate at an increasing rate until self destruction occurs.

Among the disadvantages of prior art runaway valves is that it is difficult to test the valve in order to ascertain whether it is in proper operating condition, without actually creating the runaway flow conditions which can trigger the valve. Therefore, the operability of such valves only becomes known as a result of an actual system failure which creates the runaway flow conditions; however, if the valve fails under these actual conditions a catastrophic result could occur. It therefore would be an advantage if a safety test feature could be provided for such valves, in order to evaluate operability of the valve under other than catastrophic conditions.

SUMMARY OF THE INVENTION

The present invention provides a safety feature for testing runaway control valves, constructed as a part of a runaway control valve, and wherein the valve incorporates a manual reset feature for resetting the valve after operability has been tested. The valve comprises a movable piston valve which is insertable into the air flow passage, a diaphragm mounted in a pressure chamber for monitoring pressure drop through the valve, coupled to a slidable valve element for introducing pressurized air into the piston chamber, thereby to slide the piston into blocking relationship to the air passage. The invention also includes a manually-operable valve for manually simulating an increase in the pressure drop across the valve so as to simulate a runaway flow condition, and a manually-operated reset valve to disconnect air pressure in the piston chamber, thereby causing the piston to move away from blocking relationship to the air passage.

It is a principal object of the present invention to provide an air runaway valve having a safety test feature.

It is another object of the present invention to provide an air runaway valve which may be manually tested and manually reset during normal operation.

It is another object of the present invention to provide a runaway flow control valve for insertion into a pressurized line whereby the valve may be manually reset and tested at any time.

The foregoing objects will become apparent from the following specification and claims, and with reference to the appended drawings.

DESCRIPTION OF THE PREFERRED EMBODIMENT

Figure 1:
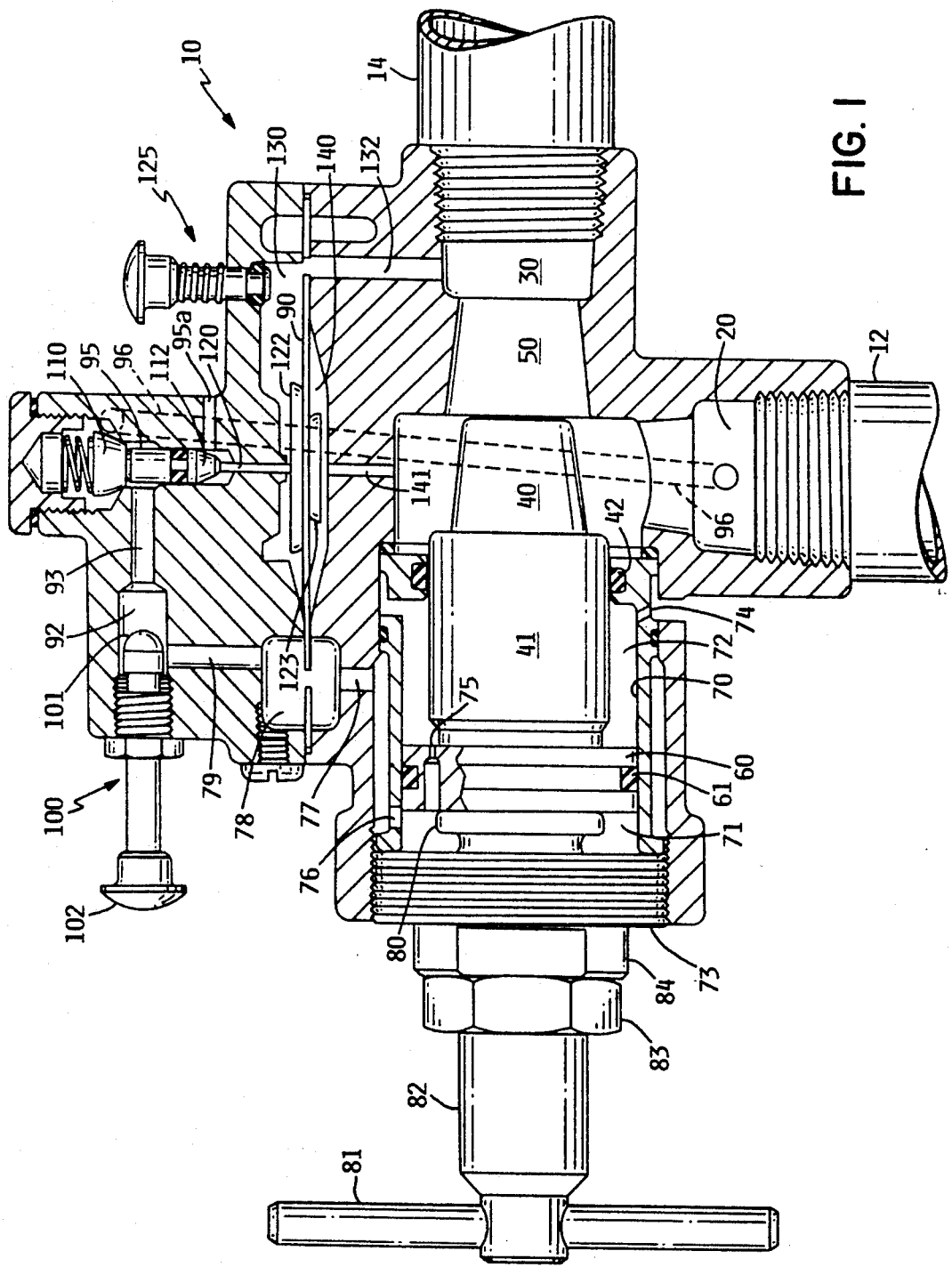
FIG. 1 shows a cross-sectional view of the invention in one operating state.

Referring to the drawings, a runaway valve 10 is connected to a pressurized air inlet line 12 and an air outlet line 14, so that pressurized air flow through the line passes through valve 10. Valve 10 has an inlet chamber 20 and an outlet chamber 30, both with suitable threads for attachment to a line connector. A valve closure member 40 is movably positionable to open and close passage 50, which bridges between inlet chamber 20 and outlet chamber 30. Valve closure member 40 is attached to a piston 60 which is movable within a cylinder 70 by selectively applying pressurized air into cylinder 70. Cylinder 70 includes a first chamber 71 which is defined by the inside surface of the cylinder walls, the outer face of piston 60, and the inner face of cylinder head 73; and chamber 72, which is defined by the inner surface of the cylinder wall, the undersurface of piston 60, and the shaft 41 between closure member 40 and piston 60. Chamber 72 has a passage 74 exposed to atmosphere, and a bleed passage 75 is formed through piston 60 between chambers 71 and 72. A suitable O-ring seal 61 is formed about the circumference of piston 60 to provide an adequate air seal between chambers 71 and 72. Likewise, an O-ring 42 is formed about the circumference of shaft 41 to provide an air seal between inlet chamber 20 and chamber 72.

A piston stop member 80 projects into chamber 71, and serves to limit the leftward excursion or movement of piston 60. Stop member 80 may be adjustably positioned within chamber 71 by turning handle 81, which is part of a threaded shaft 82 connected to stop member 80. Threaded shaft 82 extends through locknuts 83 and 84, to permit threadable shaft 82 to be screwed either into chamber 71 or out of chamber 71, thereby adjustably positioning stop member 80.

An inlet passage 76 is formed through cylinder 70, and is coupled to a further passage 77 formed in the valve housing. Passage 77 opens into a chamber 78, and chamber 78 is divided into two sections by a diaphragm 90; however, an opening is formed through diaphragm 90 so as to maintain the two sections of chamber 78 at the same pressure. A passage 79 extends between chamber 78 and a further chamber 92. A passage 93 extends between chamber 92 and another chamber 95. A passage 96 extends between chamber 95 and inlet chamber 20. A reset valve 100 is affixed to the housing of valve 10, having a movable valve member 101 positionable in chamber 92. Valve 100 has an actuator button 102 which may be depressed to cause valve member 101 to move into blocking relationship in passage 93. Diaphragm 90 is clamped between an upper diaphragm clamp 122 and a lower diaphragm clamp 123, and is movable in chambers 130 and 140.

A spring-biased valve member 110 is movably positionable within chamber 95, the spring bias being sufficiently large to cause valve member 110 to become seated in closure relationship to chamber 95. An extension 112 of valve member 110 projects downwardly in chamber 95, and is in contact with the top end of an actuator pin 120, the bottom end of the actuator pin 120 abuts against an upper diaphragm clamp 122. Actuator pin 120 therefore moves upwardly and downwardly as diaphragm 90 is deflected upwardly and downwardly within chamber 130. When diaphragm 90 is approximately at the upper end of its deflection within chamber 130, pin 120 moves valve extension 112, which causes valve member 110 to lift from its seat, thereby permitting the passage of air from passageway 96 to chamber 95 and passageway 93.

Chamber 130 is connected to outlet chamber 30 by means of a connecting passage 132. A spring-biased valve 125 projects into chamber 130, to open chamber 130 to atmosphere when valve 125 is depressed. When valve 125 is released, the spring bias seats a closure member in the valve passage, thereby blocking the chamber 130 from atmosphere.

The underside of diaphragm 90 forms one boundary for chamber 140, and passage 141 connects chamber 140 to inlet chamber 20. Therefore, the pressure in chamber 140 is always equal to the pressure in inlet chamber 20. Conversely, the pressure in chamber 130 is always equal to the pressure in outlet chamber 30.

FIG. 1 shows runaway valve 10 in its normal operating position. In this position, closure member 40 is retracted away from connecting passage 50, and air may flow freely from inlet 12 through passage 50 to outlet 14. The pressure drop between inlet chamber 20 and outlet chamber 30 is negligible. The pressure in inlet chamber 20 is conveyed via passage 141 to diaphragm chamber 140; the pressure in outlet chamber 30 is conveyed via passage 132 to diaphragm chamber 130. Since these pressures are proximately equalized, diaphragm 90 is stabilized between chambers 130 and 140, extending approximately horizontally across the chambers.

The compression spring of valve 110 forces the closure member into blocking relationship between passage 96 and chamber 95, thereby closing off any air flow into passage 93. It should be noted that the lower portion of chamber 95 is relieved to atmosphere via vent passage 95a.

The forces acting against piston 60 under normal flow conditions as shown in FIG. 1 are explained by the following. The pressure developed in inlet chamber 20 is applied against closure member 40 and shaft 41 to exert a leftward force against piston 60. The pressures in chambers 71 and 72 are equalized by virtue of the bleed passage 75, and therefore piston 60 is moved leftward until it contacts stop 80. Any pressure forces developed during the leftward movement of piston 60 are relieved via bleed passage 75 and bleed passage 74 which goes to atmosphere from chamber 72.

Figure 2:
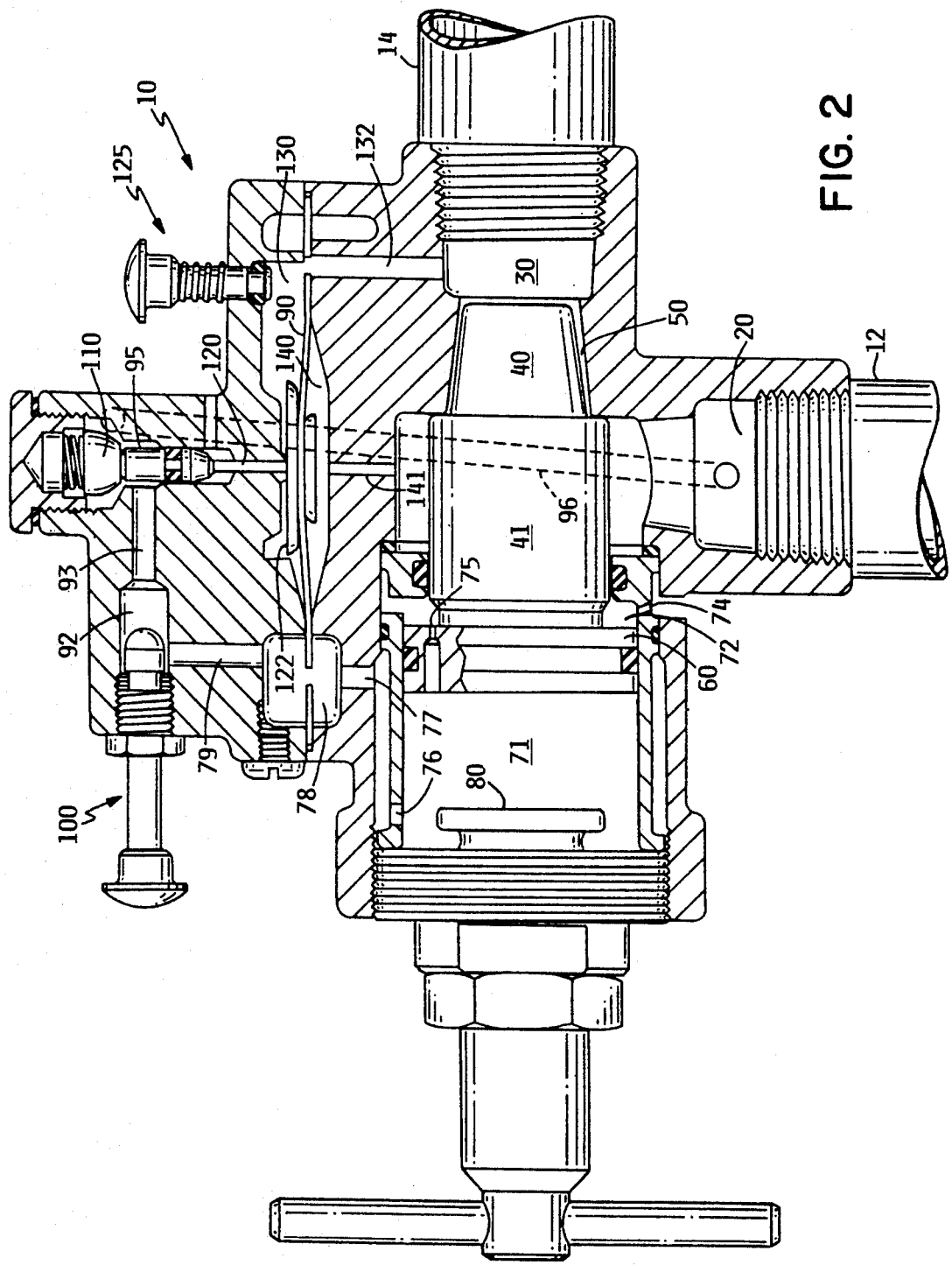
FIG. 2 shows a cross-sectional view of the invention in a second operating state.

The conditions for activating runaway valve 10 under excessive flow circumstances are shown in FIG. 2. The initial conditions are an excessive flow of air through the valve from inlet 12 to outlet 14, thereby causing a pressure drop from inlet chamber 20 to outlet chamber 30. This pressure drop is sensed via passages 141 and 132, causing a relative buildup of pressure in chamber 140, and a relative decrease in pressure in chamber 130. This pressure differential causes diaphragm 90 to move upwardly until upper clamp member 122 contacts the top of the chamber. The upward movement of diaphragm 90 causes pin 120 to also move upwardly, thereby moving valve 110 upwardly against the force of its compression spring. Valve 110 becomes unseated from its closure position, thereby permitting the flow of pressurized air from inlet chamber 20, via passage 96, into chamber 95 and passage 93. The pressurized air flow passes from passage 93 into chamber 92, and into passage 79 and chamber 78, and into passage 77 and 76 into piston chamber 71. Keeping in mind that piston chamber 72 is vented to atmosphere via passage 74, the buildup in pressure in piston chamber 71 immediately causes a rightward movement of piston 60, shaft 41 and closure member 40. This movement continues until closure member 40 closes off the connecting passage 50 between inlet chamber 20 and outlet chamber 30, thereby blocking the flow of air through valve 10.

Valve 10 will remain in a closed position until the pressure in chamber 71 can be relieved. This occurs by depressing slide valve 100 until its closure member blocks passage 93, thereby blocking the pressurized air into piston chamber 71. The existing pressure in piston chamber 71 is bled via passage 75 into chamber 72, and from there into atmosphere via passage 74. Within a very short time the pressure becomes equalized across the two faces of piston 60, and the pressure developed within inlet chamber 20 acts against shaft 41 and closure member 40 to begin moving piston 60 leftwardly. Leftward movement of piston 60 continues until it contacts stop 80, wherein the valve is once again in the fully open position, to restore flow conditions to normal operation. If the runaway flow condition has been corrected, the pressure drop from inlet chamber 20 to outlet chamber 30 again becomes negligible, and diaphragm 90 returns to its neutral position in chambers 130 and 140, and the spring force against valve 110 causes the valve closure member to block the further flow of air. At this point, valve 100 may be released to allow the valve 10 to continue its normal operation. Valve 100 is referred to as a "reset" valve, because it enables valve 10 to reset itself into normal flow operation.

Valve 125 is a "test" valve which permits the operation of valve 10 to become tested without imposing a runaway flow condition upon valve 10. When valve 125 is depressed the pressure in chamber 130 immediately becomes relieved to atmosphere, thereby simulating an excessive pressure drop between inlet chamber 20 and outlet chamber 30. This relative pressure drop causes the operation described in the preceding paragraph, and forces a runaway valve into a closure position as described above. Test valve 125 may then be released to close off the passage between chamber 130 and atmosphere, and reset valve 100 may then be reactivated as described above to reset valve 10. It is therefore apparent that test valve 125 permits a very simple operational test to be applied to valve 10 without seriously interrupting the overall system operation. A test can be conducted by depressing test valve 125, permitting the valve closure operation to proceed, and then depressing reset valve 100, permitting the valve to reset itself, all within a matter of moments. This momentary interruption to system operation is a very acceptable alternative, considering that the overall operability of the runaway flow control valve may be tested under conditions which simulate realistic flow conditions. Furthermore, the testing operation requires all of the components of the valve 10 to be in proper operating condition in order for the test to successfully proceed, and therefore the test gives a very high level of assurance that the valve is in good working condition.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An air flow control valve incorporating a runaway flow test feature, comprising:
   a) a valve body having an inlet chamber and outlet chamber respectively connectable to insertion in a pressurized air line;
   b) a piston valve having a closure member slidably movable into closed position in said valve body intermediate said inlet and outlet chambers;
   c) a chamber having a first inlet passage coupled to said inlet chamber and a second inlet passage coupled to said outlet chamber, and having a diaphragm separating said first inlet passage from said second inlet passage;
   d) a second valve mechanically linked to said diaphragm, said second valve having an inlet passage coupled to said inlet chamber and an outlet passage coupled to said piston valve, whereby predetermined movement of said diaphragm causes said second valve to admit inlet chamber air to said piston valve, thereby sliding said piston valve into closed position in said valve body; and
   e) a third valve manually operable to relieve pressure from the diaphragm chamber portion coupled to said second inlet passage.

2. The apparatus of claim 1, further comprising a fourth valve manually operable to block said second valve outlet passage.

3. The apparatus of claim 1, wherein said third valve further comprises a spring-biased valve member in a passage between said diaphragm chamber portion coupled to said second inlet passage and the exterior of said valve body.

4. The apparatus of claim 3, further comprising a rod slidably coupled between said diaphragm and said second valve, for mechanically linking said diaphragm to said second valve.

5. The apparatus of claim 4, wherein said second valve further comprises a valve member spring-biased in closure relationship between said second valve inlet passage and said second valve outlet passage.

6. The apparatus of claim 1, wherein said valve body further comprises a flow passage between said inlet chamber and said outlet chamber arranged to form a right angle bend, whereby said flow passage couples to said inlet chamber along one leg of said right angle and couples to said outlet chamber along the other leg of said right angle.

7. The apparatus of claim 6, further comprising a cylinder positioned at the juncture of said right angle bend and a closure member valve seat aligned with said cylinder and located in one of said right angle lets.

8. The apparatus of claim 7, wherein said piston valve further comprises a piston slidably positionable in said cylinder and said closure member is affixed to said piston and projects out of said cylinder toward said closure member valve seat.

9. An air flow control valve comprising a valve body having a right angle air flow passage therethrough thereby forming two passage legs respectively connected to an inlet chamber and an outlet chamber; a cylinder aligned with one of said tow passage legs at the juncture of said two passage legs; a valve seat aligned with said cylinder in said aligned passage leg; a piston slidably positionable in said cylinder; a valve closure member affixed to said piston and engageable into said valve seat; first means for sensing pressure drop between said inlet chamber and aid outlet chamber, said means of sensing having a movable member responsive to said pressure drop; a second control valve mechanically linked to said movable member, and a passage closable by said second control valve, said passage coupled between said inlet chamber and said cylinder, whereby closure of said passage causes said piston to withdraw said closure member away from said valve seat; and a manually operable valve means for forcing a pressure drop between said inlet chamber and said outlet chamber relieving outlet chamber pressure.

* * * * *